United States Patent
Rettig

[11] 3,781,641
[45] Dec. 25, 1973

[54] ADJUSTABLE FREQUENCY POWER SUPPLY OF THE INVERTER TYPE

[75] Inventor: Charles E. Rettig, Brookfield, Wis.
[73] Assignee: The Louis Allis Company, Milwaukee, Wis.
[22] Filed: Jan. 8, 1973
[21] Appl. No.: 321,925

Related U.S. Application Data
[62] Division of Ser. No. 83,922, Oct. 26, 1970, abandoned.

[52] U.S. Cl................ 321/21, 321/2, 321/5, 318/227
[51] Int. Cl.................. H02m 7/00, H02m 5/44
[58] Field of Search.................. 321/2, 5, 21; 318/227

[56] References Cited
UNITED STATES PATENTS
3,430,123  2/1969  Corry et al............................ 321/5
3,648,147  3/1972  Leete.................................... 321/2

Primary Examiner—William M. Shoop, Jr.
Attorney—Andrus, Sceales, Starke & Sawall

[57] ABSTRACT

A power supply of the inverter type for controlling the operative condition of an alternating current load includes a power source, typically of the rectifier type, providing an output current. An inverter is connected to the power source and to the alternating current load for cyclically directing the output current of the power source to the load for controlling its operative condition. The power supply includes a means interconnecting, and coordinating, the operation of the power source and inverter for insuring that a current path exists in the power supply.

5 Claims, 4 Drawing Figures

ADJUSTABLE FREQUENCY POWER SUPPLY OF THE INVERTER TYPE

CROSS REFERENCE TO RELATED APPLICATION

This application is a divisional application of Ser. No. 83,922 filed Oct. 26, 1970 and now abandoned.

BACKGROUND OF THE INVENTION - FIELD OF THE INVENTION

The present invention relates to adjustable frequency power supplies for alternating current loads.

BACKGROUND OF THE INVENTION - DESCRIPTION OF THE PRIOR ART

With the advent of reliable, high power rating, low cost semiconductor components, such as silicon controlled rectifiers, commonly, and herein, termed thyristors, adjustable frequency control equipment has become more practical from a technical and economic standpoint. A highly useful application of such adjustable frequency equipment is in the control of alternating current motors. A variable frequency power supply of the inverter type includes a direct current link by which the constant frequency of the power mains is converted into direct current, as by a thyristor rectifier, and the direct current is subsequently changed back into alternating current of the desired variable frequency by a thyristor inverter.

In order for current to flow through the power supply it is necessary for at least one thyristor to be conducting in the rectifier and at least one thyristor to be conducting in the inverter. In the case in which short duration pulses are used to gate, or fire, the thyristor in the rectifier and in the inverter, it is possible to have the rectifier set to request a certain current level and the inverter set to request a certain inverter frequency and yet not have any current flow through the power supply. This situation arises because the short periods during which the thyristors in the rectifier are gated do not occur simultaneously with the short intervals during which the thyristors in the inverter are gated. Because current is requested in the power source but no current flows, the power source and its current regulating circuitry assume a state corresponding to a maximum current output.

Eventually, coincidence in the gate pulses of the thyristors in the power source and in the inverter does occur. Because the current regulating circuitry of the power source is in the maximum current condition, an undesirable surge of current occurs before the current regulating circuitry can resume its normal current regulating operation.

Occurrence of the above described condition may be prevented by providing long duration firing signal to either the thyristors of the power source or the thyristors of the inverter. This will insure coincidence of the conducting states of the thyristors in both the inverter and the power source. HOwever, the use of long duration firing signal is undesirable because of excessive gate dissipation and for other reasons.

Rather the most desirable form of firing signals for the thyristors in both the rectifier and the inverter is short duration pulses. However, the aforementioned problems attendant the lack of firing coincidence arise because the thyristors of the AC to DC rectifier are operated at a constant cyclical rate dependent on the frequency of the alternating current appearing in the power mains whereas the thyristors in the inverter are operated at the variable frequency dependent on the desired inverter output frequency.

SUMMARY OF THE PRESENT INVENTION

It is therefore, the object of the present invention to provide an improved power supply of the inverter type which overcomes the foregoing problems by coordinating the operation of the thyristors in the power source and in the inverter. More specifically, the operation of the thyristors in the power source and inverter are coordinated so that a current conduction path exists in the power supply which prevents the surges in current which might otherwise occur.

The gist of the present invention is to interconnect the firing circuit for the thyristors in the rectifier and the firing circuit for the thyristors in the inverter so that any time firing pulses are provided to one set of thyristors they are also provided to the other set of thyristors thereby establishing the desired current path.

DESCRIPTION OF THE PREFERRED EMBODIMENT

Figure 1:
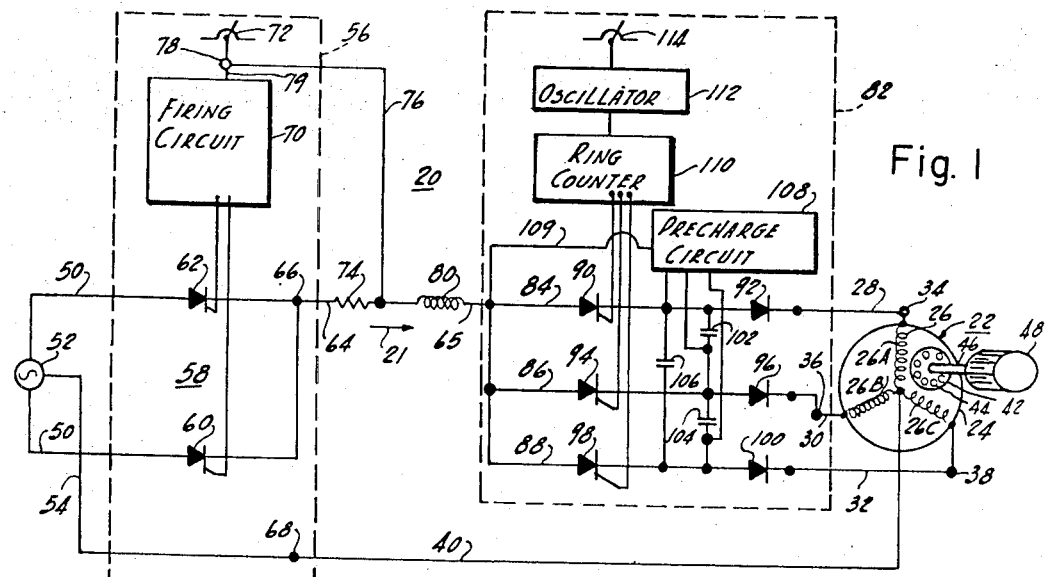
FIG. 1 is a schematic diagram of an adjustable frequency power supply.

In FIG. 1, there is shown an adjustable frequency power supply 20 for controlling the operative condition of an alternating current device, shown for illustrative purposes as induction motor 22. Alternating current induction motor 22 includes a stator 24 of conventional laminated iron core constructions having polyphase stator winding 26 disposed therein for generating a revolving magnetic field when energized. Stator winding 26 includes stator coils 26A, 26B and 26C connected to form a conventional star connected stator winding. Stator coils 26A, 26B and 26C are energized by supply lines 28, 30 and 32, respectively, connected to the corresponding motor input terminals 34, 36 and 38. A neutral conductor 40 is connected to the center tap of star connected stator winding 26.

Stator 24 surrounds rotor 42 having rotor conductors 44 circumferentially spaced in a laminated iron core. The rotor output shaft 46 is connected to the load 48 of motor 22.

When energized, motor 22 exhibits a small amount of impedance in series with each of the input terminals 34, 36 and 38. This impedance comprises, in the main, the leakage reactance of the motor and is small when compared to the rated impedance of the motor.

Power supply 20 is shown in simplified form in FIG. 1 to facilitate an understanding thereof. The supply is shown as energized by alternating current, typically, power mains 50 connected to alternating current source 52. The alternating current source includes center tap conductor 54. Power mains 50 are connected to power source 56 of power supply 20. Power source 56 may include a full wave rectifier 58 having the anodes of thyristors 60 and 62 connected to power mains 50. The cathodes of the controlled rectifiers are connected to output terminal 66 and conductor 64. The direct current output of source 56 appears at output terminal 66 and at output terminal 68 located between conductor 54 and conductor 40. The arrow identified by the number 21 in FIG. 1 indicates the output current of power source 56 and its direction of flow out of output terminal 66 and into output terminal 68.

The magnitude of direct current 21 provided by power source 56 is controlled by firing circuit 70 which supplies signals to the gate terminals of the thyristors. Firing circuit 70 may be any firing circuit suitable for providing firing signal to the thyristors at desired firing angles, responsive to a signal from a control device, such as potentiometer 72, and to the various feedback signals applied to the firing circuit, as hereinafter described. For example, firing circuit 70 may be a biased sine wave, phase shift firing circuit such as is shown on page 434 of J. Millman and S. Seely, *Electronics*, (1941).

In the embodiment shown, power source 56 functions as a current source, that is, a source, the output current of which does not vary with the output voltage. To accomplish this, it is necessary to provide current regulation to the source and to insert an inductor in the output thereof to assist in maintaining current 21 at the desired level.

A simplified current regulation circuit is exemplarily shown in connection with source 56 in FIG. 1 including an output current sensing means, such as resistor 74 in conductor 64, which provides a feedback signal corresponding to the actual output current 21 of source 56 in conductor 76. The signal in conductor 76 is compared with the signal corresponding to desired current from potentiometer 72 at summing junction 78 and a current error signal provided in conductor 79 to firing circuit 70. The regulation provided by the aforementioned feedback signal and circuitry causes the actual output current of source 56 to approach the desired current, as selected by potentiometer 72.

An inductor or choke 80 is interposed in conductor 64 to prevent any rapid changes in the magnitude of direct current 21 supplied by power source 56. Inductor 80 serves to absorb short duration voltage transients and smooth out the ripple current produced in the power supply and further, provides the necessary integration function essential to the stability of the current regulator. The size of inductor 80 may be commensurate with the speed of regulating action of the current regulator.

Current regulated power source 56 and inductor 80 form a current source which provides current 21 of a desired magnitude to the remaining portion of the power supply. In order to maintain a current source characteristic of power supply 20, it is essential that no substantial energy storage means of the constant voltage type, for example, capacitors, be placed across conductors 64 and 40, either in the inverter portions of the power supply or elsewhere, as such elements would compromise the current nature of the power supply.

Inverter 82 is connected to conductor 65 in series with inductor 80 and the terminals 34, 36, and 38 of motor 22 to cyclically direct current 21 into stator coils 26A, 26B and 26C so as to provide the rotating magnetic field in motor 22 necessary to revolve motor output shaft 44. In the simplified motor control 20 shown in FIG. 1, the current 21 flows into each stator coils 26A, 26B and 26C from the respective input terminals 34, 36 and 38 and flows out of the winding into conductor 4o for return to terminal 68 of power source 56.

Inverter 82 comprises three parallel current paths 84, 86 and 88 extending between conductor 64 and output conductors 28, 30 and 32. Thyristor 90 and diode 92 are connected in series in current path 84. Thyristor 94 and diode 96 are connected in series in current path 96 and thyristor 98 and diode 100 are connected in series in current path 88.

A commutating capacitor is connected across each pair of current paths to effect turn off of the thyristors 90, 94 and 98. Capacitor 102 is connected across current paths 84 and 86, capacitor 104 is connected across current paths 86 and 88, and capacitor 106 is connected across current paths 84 and 88. To assist in the start up of inverter 82, a precharge circuit 108 is connected to the capacitors and by conductor 109 to conductor 65.

Thyristors 90, 94, 98 are fired, or rendered conductive, by a firing means which may typically consist of ring counter 110 and oscillator 112. Oscillator 112, which may be of the relaxation type, generates a series of firing pulses to ring counter 110. The frequency of generation of these pulses is determined by a control, shown diagrammatically as potentiometer 114. Ring counter 110 distributes these firing pulses to thyristors 90, 94 and 98 in the desired sequence. The desired sequence may be as above, or it may be the reverse, i.e. thyristors 98, 94, and 90. The sequence in which the thyristors are fired determines the sequence energization of the stator coils of motor 22 and the direction of rotation of the rotating magnetic field of stator winding 26 of motor 22. The rate at which firing pulses are generated by oscillator 112 determines the speed of rotation of the stator magnetic field. Ring counter 110 may be of the type shown on page 4—4 of *Application Memos*, published by the Signetics Corp., Sunnyvale, California, (1968).

Inverter 82, which may be described as a diode isolated capacitor commutated inverter, effects commutation by current transfer, that is, by transferring current out of one of the parallel current paths into another current path.

In operation, potentiometer 72 is adjustable to provide current 21 of a desired magnitude at output terminals 66 and 68 of power source 56. Inverter 82 causes a periodic and sequential application of this current to stator coils 26A, 26B and 26C in the form of square wave current pulses. The current pulses generate a rotating stator magnetic field in motor 22. The interaction of the stator field with rotor conductors 44 causes rotor 42 to rotate in accordance with the rotation of the stator magnetic field and at a speed proportional to the frequency of application of the stator current pulses, as selected by manipulation of potentiometer 114.

The manner in which inverter 82 causes the periodic and sequential application of current 21 to the coils of stator winding 26 is as follows. It may be assumed that thyristor 90 is in the conductive state and is supplying current 21 from output terminal 66 of power source 56 through diode 92 to conductor 28 and stator coil 26A. It may also be assumed that capacitor 106 and capacitor 102 have been charged such that a positive potential exists on the common connection of the cathode of thyristor 90, the upper plates of capacitors 106 and 102 and the anode of diode 92.

When current 21 has flowed through stator coils 26A for a time period commensurate with the frequency of energization of stator winding 26, thyristor 94 is gated. When thyristor 94 is gated, the current in thyristor 90 is extinguished by the voltage on capacitors 106 and 102. Thyristor 90 is thus commutated off by capacitors 106 and 102. The current 21 from power source 56 then flows through thyristor 94 but remains momentarily unchanged through diode 92, capacitors 102, 104 and 106 and stator coil 26A. Current flow through capacitor 102 from thyristor 94 to diode 92, discharges capacitor 102, causing its voltage to go through zero and to build up in the opposite polarity. As the voltage on capacitor 102 becomes equal to the voltage between conductors 28 and 30, diode 96 becomes unblocked and the voltage on capacitor 102 is applied to stator coils 26A and 26B. This initiates current flow in conductor 30 and stator coil 26B and commences the transfer of current from stator coil 26A to 26B. The transfer of current from stator coil 26A to 26B of motor 22 proceeds at an increasing rate as the voltage on capacitor 102 continues to build up due to the stator coil 26A current still flowing through it. Finally, the complete current 21 from power source 56 is transferred or commutated into stator coil 26B, leaving capacitor 102 charged with a very substantial negative potential at the upper plate and a corresponding positive potential at the lower plate, due to the leakage reactance of the motor 22.

During the above described commutation, at the same time current is flowing through capacitor 102, current is also flowing serially through capacitor 104 and capacitor 106 so that at the completion of the commutation, capacitor 104 has been charged with its upper plate positive and its lower plate negative. This charge and the charges on capacitors 102 and are retained on the capacitors by the blocking, or isolating, action of the associated diodes.

When thyristor 98 is fired to continue the cyclical application of current 21 to stator winding 26, capacitors 102 and 104 effect the turn off of thyristor 94 and the commutation of current from stator coil 26B and 26C in a manner similar to that described above. When thyristor 90 is fired capacitors 104 and 106 effect the turn off of thyristor 98 and the commutation of current 21 from stator coil 26C to 26A.

While the thyristors in power supply 20 have been shown as silicon controlled rectifiers in FIG. 1, it will be appreciated that other devices such as gas filled tubes may be used.

The repetitive and sequential application of current 21 to the coils of stator winding 26 by inverter 82 is continued during the motoring operation of motor 22 to drive load 48. The speed of motor 22 and load 48 may be altered by altering the frequency of application of the current pulses, as by manipulation of potentiometer 114.

The magnitude of the output current 21 of power source 56 is maintained at the desired level regardless of load and speed changes in motor 22, and the resulting voltage changes in power supply 20, by the action of the current regulating circuitry of power source 56. This circuitry advances or retards the firing angles of the thyristors in rectifier 58 so as to provide the output voltage from power source 56 necessary to maintain current 21 at the desired level. The magnitude of current 21 may be altered by manipulation of potentiometer 72.

Power supply 20 is inherently capable of regenerative operation. Regenerative operation facilitates maintaining control over the speed of motor 22 under conditions in which load 48 is driving motor 22 faster than inverter 82. Such a condition is commonly called operation with an overhauling load and results in a reversal of the voltage between conductors 65 and 40 so that the motor becomes a source of electrical power, rather than a load. The direction of current flow through power supply 20 remains the same.

As in motoring operation, the current regulating circuitry of power source 56 operates to automatically maintain current 21 of power supply 20 at the desired level, regardless of the terminal voltage inverter 82 and will provide from power source 56, a voltage of the magnitude and polarity necessary to so maintain the current. Under conditions in which the voltage at the terminals of motor 22 has reversed, the current regulating circuitry of power source 56 will cause the voltage of the power source to reverse so that the power source becomes an electrical load for motor 22 as a source. This effects regenerative operation.

Figure 2:
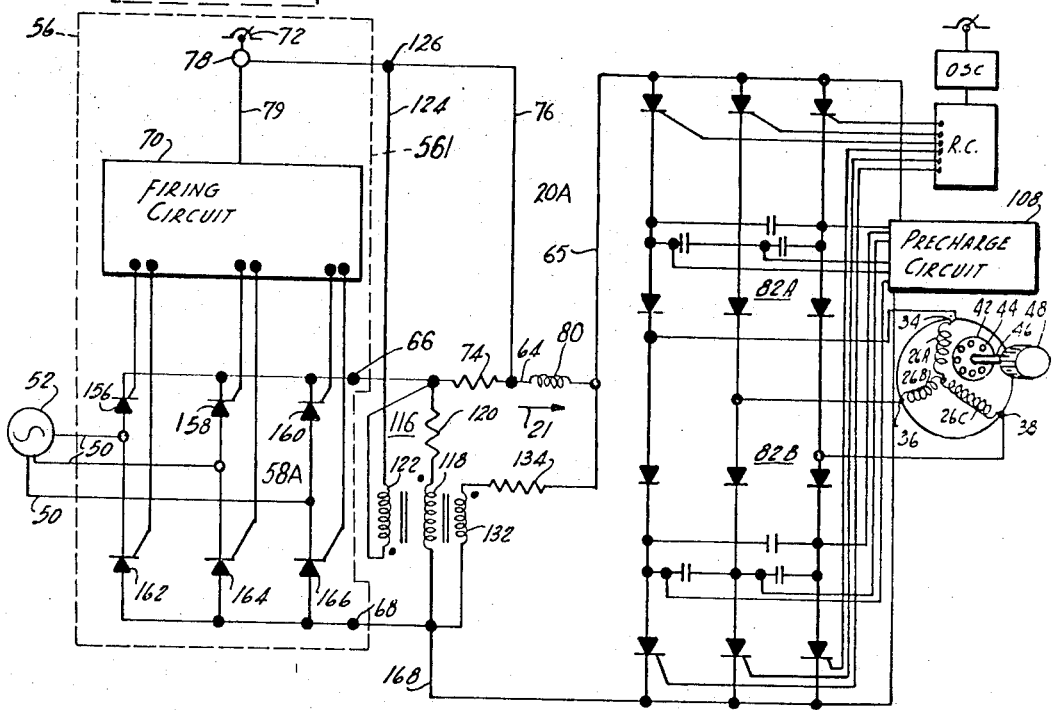
FIG. 2 is a schematic diagram of another embodiment of an adjustable frequency power supply.

FIG. 2 shows, in schematic form, a more elaborate embodiment of adjustable frequency current source power supply 20. The power supply, 20A, is shown as energized by three phase power mains 50. Further, power supply 20A is shown as including a pair of series connected inverters 82A and 82B. Supply lines 28, 30 and 32 are connected between inverters 82A and 82B so that by the coordinated operation of inverter 82A and inverter 82B, current 21 may be made to flow both into and out of each of stator coils 26A, 26B and 26C. In this respect, the operation of power source 20A of FIG. 2 differs from the operation of power source 20 shown in FIG. 1. Power source 20A permits operation of motor 22 in a manner analogous to direct connection of the motor to a polyphase alternating current power outlet. Neutral conductor 40 is eliminated.

Power mains 50 are connected to the anodes of thyristors 156, 158 and 160 and to the cathodes of thyristors 162, 164 and 166 of A.C. to D.C. power supply 561. The cathodes of thyristors 156, 158 and 160 are connected to conductor 168. The anodes of thyristors 162, 164 and 166 are connected to conductor 64. It will be recognized that thyristors 156 through 166 form a full wave rectifier bridge 58A.

FIG. 2 also shows additional regulation of the output of power supply 561 in the form of a voltage rate feedback circuit which is described and claimed in a related application.

Figure 3:
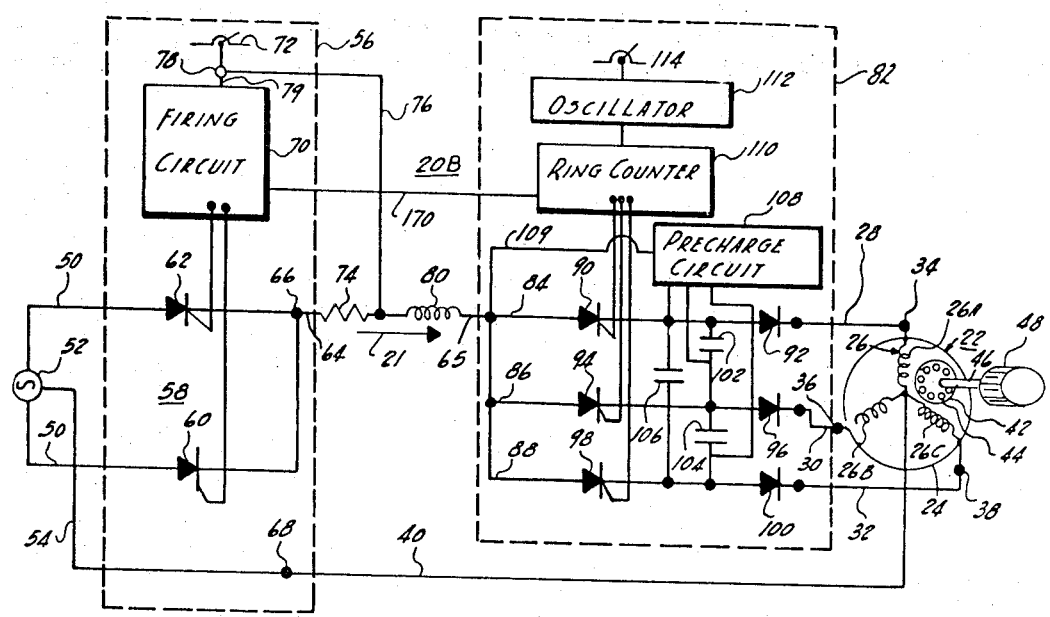
FIG. 3 is a schematic diagram of an embodiment of the adjustable frequency power supply of the present invention in which the elements thereof are interconnected to insure smooth operation of power supply.

FIG. 3 shows power supply 20B of the present invention in which the operation, particularly the smoothness of starting, is further improved by interconnecting firing circuit 70 and ring counter 110 of inverter 82 as shown in FIG. 3 so as to insure the coordination between the two circuit elements necessary to overcome the shortcomings of the prior art noted, supra.

To provide a means of insuring coincidental application of short duration firing pulses to the thyristors of both power source 56 and inverter 82, the firing pulses of firing circuitry 70 are utilized to affect the operation of inverter 82. Other arrangements, such as utilizing the firing pulses of oscillator 112 to affect the operation of power source 56, are not as effective. Power supply 20B of FIG. 3 shows an embodiment of the invention similar to that shown in FIG. 1 with the addition of the connection for coincident gating. Conductor 170 is connected to the output of firing circuit 70 and contains the output firing pulses of the firing circuit. These firing pulses are provided at fixed intervals dependent on the frequency of the alternating current in power mains 50.

Figure 4:
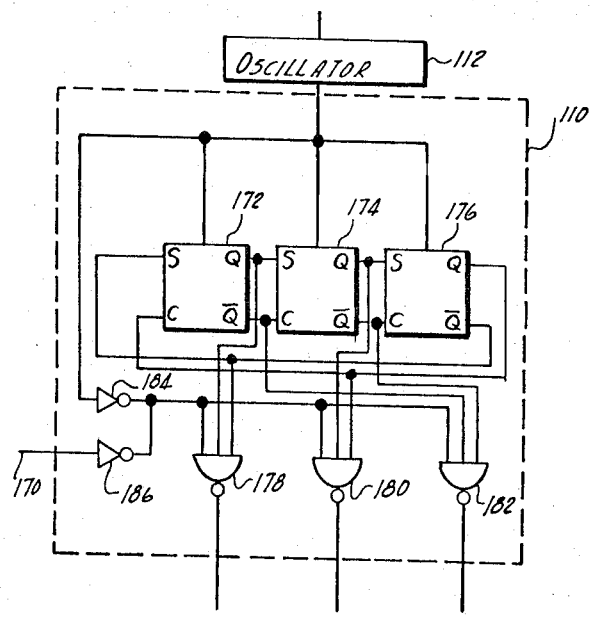
FIG. 4 is a partial schematic diagram of a circuit element suitable for inclusion in the power supply of FIG. 3.

As noted supra, ring counter 110 distributes the gating pulses of oscillator 112 to the controlled rectifiers of inverter 82 in a predetermined sequence. For this purpose, ring counter may include three bi-stable elements 172, 174 and 176 commonly termed flip-flops, connected in the well known manner as shown in FIG. 4, to form a ring counter. Oscillator 112 is connected to the clock inputs of flip-flops 172, 174 and 176. The outputs of flip-flops 172, 174 and 176 are connected to three output NAND gates 178, 180 and 182 which convert the bi-stable, or 180°, operation of the flip flops into 120° operation needed for the three thyristors 90, 92 and 94 in inverter 82. The output of oscillator 112 is connected through inverting amplifier 184 to NAND gates 178, 180 and 182 so that each time a firing pulse is generated by oscillator 112 a successive one of the NAND gates is opened to provide a firing signal to one of the thyristors in inverter 82. The other two NAND gates remain closed.

Conductor 170 is connected to NAND gates 178, 180 and 182 of ring counter 110 through inverting amplifier 186 so that a firing pulse from firing circuit 80 opens one of the NAND gates in the same manner as a firing pulse from oscillator 112 does, thereby providing a firing signal to one of the thyristors in inverter 82. This insures that any time firing pulses are provided to the thyristors of power source 56, firing pulses are also provided to the thyristors of inverter 82 so that a complete current conducting path exists through power source 20 at all times, thereby preventing surges in current which might otherwise occur. Because conductor 170 is not connected to the clock inputs of flip-flops 172, 174 and 176 no sequential opening of NAND gates 178, 180 and 182 is obtained by the application of the firing pulses from firing circuit 70. Rather the firing pulses from firing circuit 70 are repeatedly provided to one controlled rectifier in inverter 82 through the one NAND gate of the three which is operable by such pulses, as determined by the operative states of the flip-flops.

The provision of the firing pulses of firing circuit 70 to the thyristors of inverter 82 is in addition to the firing pulses from oscillator 112 and serves to insure that at least one thyristor of inverter 82 is in the conductive state under conditions in which firing pulses from firing circuit 70 and oscillator 112 are not generated coincidentally. As the NAND gates of ring counter 110 sequentially assume the operable state, responsive to the gating pulses of oscillator 112 to flip-flops 172, 174 and 176, the firing pulses of firing circuit 70 are sequentially provided to each of the thyristors of inverter 82 during the interval when the respective thyristor is designated by the logic circuitry to be conductive.

While the power supply of the present invention has been exemplarily shown and described in connection with an alternating current device in the form of an induction motor, it must be noted that the power supply is also suitable for use with other types of motors, such as synchronous motors, and is suitable for use with other types of alternating current loads, such as induction heating apparatus and high frequency lighting equipment.

Further, the benefits of phase multiplication illustrated by the full wave configuration shown in FIG. 2 may be extended further by techniques commonly used in polyphase rectifier circuitry. For this purpose, and in the case of an alternating current motor, the stator winding may be arranged in two or more isolated groups wherein each group is made up of stator coils such as 26A, 26B and 26C in a symmetrical arrangement. Each group may then be connected to its own inverter with the operation of the individual inverters being coordinated to apply current to each coil at the desired time.

Where two or more inverters are employed in the power supply, the connection to the power source may be either serial or parallel. In the series connection, current 21 is identically the same in all inverters. In the parallel connection, an individual inductor 74 may be provided with each inverter to maintain the desired smoothness of direct current in the individual inverters. Alternately, a separate power source may be provided with each inverter, in which case all power sources are made responsive to the same current reference signal.

Phase shifting transformers may be interposed between the inverter of the power supply and the alternating current load to achieve the benefits of multiphase operation without requiring a special grouping of coils in the alternating current load.

Various modes of carrying out the invention are contemplated as being within the scope of the following claims particularly pointing out and distinctly claiming the subject matter which is regarded as the invention.

I claim:

1. A power supply interposible between a source of electrical energy and the terminals of an alternating current device for effecting variable frequency energization of the device, said power supply comprising:

a power source having an input connectable to said electrical energy source and having current conduction means intermittently switchable from a non conductive state into a current conductive state by a train of control pulses for providing unidirectional current of a controllable magnitude at the output thereof;

first control circuitry coupled to said current conduction means for providing said train of control pulses to said current conduction means;

an inverter having an input connected to said power source and an output connected to the terminals of said alternating current device, said inverter including at least a pair of current paths between the input and output thereof each containing a thyristor, second control circuitry coupled to the thyristors for providing triggering signals to the thyristors to sequentially place them in the current conductive state for providing variable frequency energization to the device, said second control circuitry including means responsive to a pulse train input signal for repetitively providing triggering signals to at least one of said thyristors, said inverter including means for transferring current between said paths and for placing said thyristors in the non conductive state; and signal means coupling said first control circuitry to said means in said second control circuitry for providing the train of control pulses of said first control circuitry to said second control circuitry for causing said second control circuitry to repetitively place at least one of the thyristors in the inverter simultaneously in the current state with the intermittently operable current conduction means in the power source for establishing a current conduction path in the power supply.

2. The power supply of claim 1 wherein said inverter is further defined as including at least a pair of parallel current paths each containing a series connected thyristor and diode and a capacitor connected across the current paths intermediate the thyristor and diode of each pair of transferring current between said paths and for placing said thyristors in the nonconductive state.

3. The power supply according to claim 1 wherein said second control circuitry includes an oscillator for generating a series of pulses in accordance with the desired frequency energization of the device, and a signal distribution means coupled to said oscillator and operable by said oscillator pulses for establishing a thyristor triggering sequence and for sequentially applying triggering signals to said thyristors, said signal distribution means being further coupled to said signal means and operable by said train of control pulses for forming said pulse train responsive means.

4. The power supply of claim 3 wherein said signal distribution means includes a ring counter coupled to said oscillator and operable by said oscillator pulses for establishing a thyristor triggering sequence and a signal gating means coupled to and placed in a sequentially operative state by said ring counter and operable by said oscillator for sequentially applying triggering signals to said thyristors, said signal gating means being further coupled to said signal means and operable by said train of control pulses for forming said pulse train responsive means.

5. The power supply of claim 3 connectable to a source of A.C. electrical energy wherein said power source comprises a rectifier and wherein current conduction means comprise thyristors connected in a rectifying configuration.

* * * * *